United States Patent [19]

Fujimoto et al.

[11] Patent Number: 5,020,647

[45] Date of Patent: Jun. 4, 1991

[54] LOCK-UP DAMPER DEVICE FOR TORQUE CONVERTER

[75] Inventors: Shinji Fujimoto; Yukiyoshi Takada, both of Neyagawa, Japan

[73] Assignee: Kabushiki Kaisha Daikin Seisakusho, Osaka, Japan

[21] Appl. No.: 494,375

[22] Filed: Mar. 16, 1990

[30] Foreign Application Priority Data

Mar. 20, 1989 [JP] Japan .................................. 1-68188
Mar. 20, 1989 [JP] Japan .................................. 1-68189

[51] Int. Cl.[5] ................................................ F16D 3/14

[52] U.S. Cl. .................................. 192/3.29; 192/3.33; 192/106.2; 464/64

[58] Field of Search .................... 192/3.28, 3.29, 3.33, 192/106.2; 464/63, 64, 66

[56] References Cited

U.S. PATENT DOCUMENTS

| | | | |
|---|---|---|---|
| 4,138,003 | 2/1979 | Malloy | 192/3.29 |
| 4,347,717 | 9/1982 | Lamarche | 464/64 |
| 4,422,535 | 12/1983 | Ling | 192/106.2 |
| 4,559,024 | 12/1985 | Tamura et al. | 192/106.2 |
| 4,637,500 | 1/1987 | Göbel et al. | 192/3.28 |
| 4,693,348 | 9/1987 | Tsukamoto et al. | 192/3.29 |
| 4,694,941 | 9/1987 | Hall et al. | 192/3.28 |
| 4,716,998 | 1/1988 | Tsukamoto et al. | 464/63 |

*Primary Examiner*—Allan D. Herrmann
*Assistant Examiner*—Nicholas Whitelaw
*Attorney, Agent, or Firm*—Armstrong, Nikaido, Marmelstein, Kubovcik, & Murray

[57] ABSTRACT

A lock-up damper device for a torque converter comprising a piston clutch plate slidable in axial direction and equipped with a friction facing pressed on a front cover and a driven plate interconnected to a turbine in between the front cover and the turbine. The piston clutch plate and the driven plate are coupled to each other, for relative rotation by torsion springs arranged longitudinal in circumferential direction of such plates. The torsion springs are installed at outer and inner peripheral parts of the plates. The torsion springs installed on the inner peripheral part of said plates is in contact at at least their radial outer peripheral, radial inner peripheral and side portions between said radial outer and inner peripheries with a wall of a concave portion formed on the piston clutch plate, and the torsion springs installed on the outer and inner peripheral parts are held by the drive plate secured to the piston clutch plate.

3 Claims, 7 Drawing Sheets

18
19c
35
37
20
12
43
36
II
38
39
23
44
42
26
21
29
51
16
19a
30
19
22
28
19d
14
41
19b

19a

19

23

LOCK-UP DAMPER DEVICE FOR TORQUE CONVERTER

BACKGROUND ART

Industrial useful field

This invention relates to a lock-up damper device which is installed between a front cover and a turbine of a torque converter for transmitting an input torque, transmitted from an engine to the front cover, directly to an output shaft interconnected to a succeeding transmission and, at the same time, prevent engine vibrations from being transmitted directly to the output shaft when torque is transmitted.

Prior art and its problem

FIG. 6 shows a vertical sectional view of a torque converter employing a lock-up damper device having torsion springs at its radial outer peripheral part FIG. 7 is a view showing the lock-up damper device of FIG. 6 viewed in a direction of arrow VII. In FIG. 6, a torque converter body 10 comprises a pump 11, a turbine 12 and a stator 13 etc. The pump 11 is welded to a front cover 14 at an outer peripheral end portion.

The front cover 14, at its inner periphery is coupled to an input shaft 15. The turbine 12 is secured to a hub 16 spline fitted onto an output shaft 17 interconnected to a succeeding transmission.

A lock-up damper device 18 is installed between the turbine 12 and the front cover 14. The lock-up damper device 18 is composed of a piston clutch plate 19 having a friction facing 19a and slidable freely in its axial direction, a drive plate 61 secured to the piston clutch plate 19, a driven plate 21 secured to the hub 16, and torsion springs 20 disposed at plural places, in a circumferential direction, for connecting the piston clutch plate.. 19 and the driven plate 21 relatively rotatably with each other. The friction facing 19a presses on the front cover 14 so as to transmit the input torque, transmitted to the front cover 14, through the hub 16, directly to the output shaft 17.

However, a characteristic of transmission torque in relation to torsion angle of the lock-up damper device 18 in the torque converter of FIG. 6, is limited to a narrow range because the torsion spring 20 are installed on the outer peripheral part. Thus it is insufficient to install such springs only on the outer peripheral part. FIG. 8 shows an embodiment where torsion spring 23 are installed on an inner peripheral part. Here also transmission torque relative to torsion angle is limited.

In order to widen the range of the foregoing characteristic, an embodiment has been proposed wherein the torsion springs have been installed on both outer and inner peripheral parts as illustrated in FIG. 9 and FIG. 10. In this embodiment, the torsion spring 20 have been installed on the outer peripheral part and the torsion spring 23 have been installed on the inner peripheral part. However, the embodiment of FIG. 9 has included problems such as complicated structure and high manufacturing cost because two drive plates 24a and 24b and a driven plate 25 have been put together in the axial direction (lateral direction of the figure). In the embodiment of FIG. 10, the drive plate is composed of a retaining plate 22 and a side plate 26. The retaining plate 22 holds the torsion spring 23 disposed at the inner peripheral part in such a manner as to wrap it from the piston clutch plate 19 side. Accordingly, an axial space for holding the torsion spring 23 becomes small by an amount corresponding to a plate thickness (thickness X in FIG. 10) of the retaining plate 22, an usable diameter of the torsion spring 23 also becomes small. Therefore, the structure has included problems such as a failure in improvement of vibrational absorptivity of the torsion spring 23 i.e. a failure in improvement of vibrational absorptivity of the lock-up damper device 18, and a troublesome working due to complicated shape of the retaining plate 22.

SUMMARY OF THE INVENTION

An object of this invention is to provide a lock-up damper device for a torque converter, in which a diameter of a torsion spring installed on an inner peripheral part can be made larger than that of the heretofore conventional spring, a range of characteristic of transmission torque in relative to torsion angle can be widened and the torsion spring at the inner peripheral part of the damper device can be held by a simple structure; enabling a simplification of manufacturing, decrease in weight of the device and a reduction of cost etc.

This invention provides a lock-up damper device for a torque converter, in which a piston clutch plate, slidable in axial direction and equipped with a friction facing, for pressing on a front cover of the torque converter and a driven plate, interconnected to a turbine, are installed between the front cover and the turbine, a drive plate, secured to the piston clutch plate, and the driven plate are coupled through plural torsion springs longitudinal in the circumferential direction of the damper device, in such a manner as to be relatively rotatable to each other, and the torsion springs are installed on both outer and inner peripheral parts; characterized by that the torsion spring installed on the inner peripheral part is brought under a state where at least a radial outer peripheral, an inner peripheral and side portions of a semi-circular front cover side face make contact with a wall of a concave portion formed on the piston clutch plate, and the torsion springs, installed on the outer and inner peripheral parts, are held by the drive plate.

Because the torsion spring, installed on the inner peripheral part, makes contact with the wall of the concave portion of the piston clutch plate, in the lock-up damper device according to the present invention, a torsion spring becomes usable which has a diameter larger than that of FIG. 10 by an amount corresponding to a plate thickness (thickness X in FIG. 10) of the retaining plate. Further, structure of the drive plate is also simplified.

BRIEF DESCRIPTION OF THE DRAWINGS

FIG. 6 is a vertical sectional view showing a torque converter employing a conventional lock-up damper device.

DETAILED DESCRIPTION OF THE INVENTION

First embodiment

Figure 1:
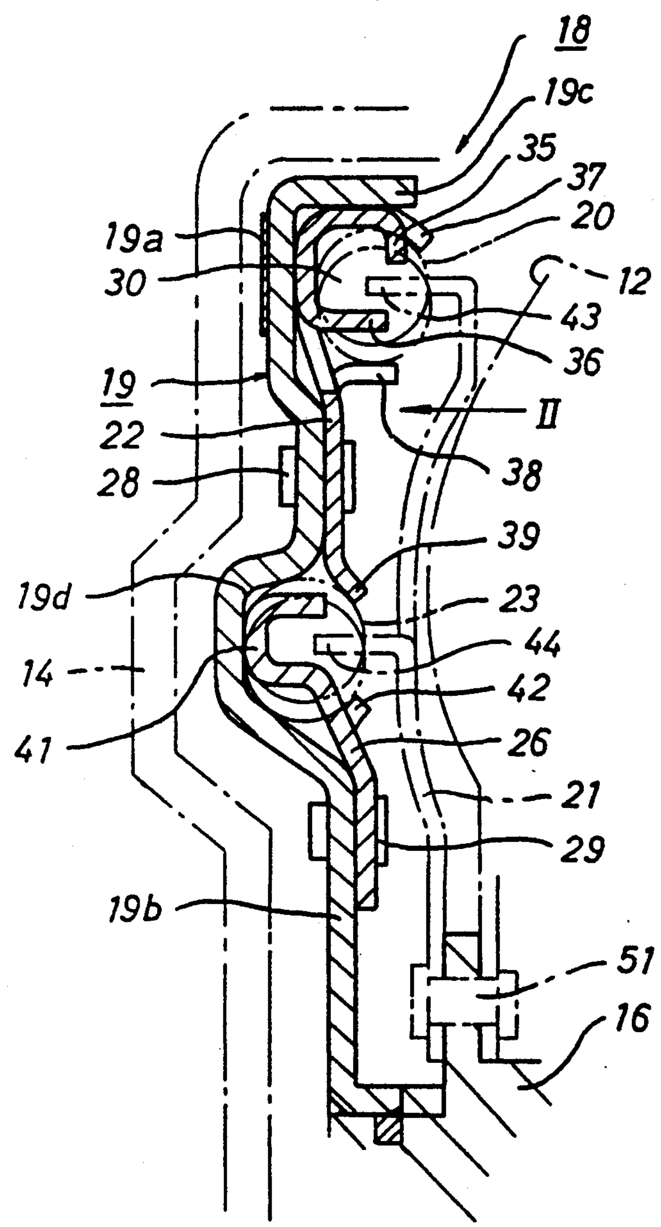
FIG. 1 is a vertical sectional partial view showing a first embodiment of this invention.
Figure 2:
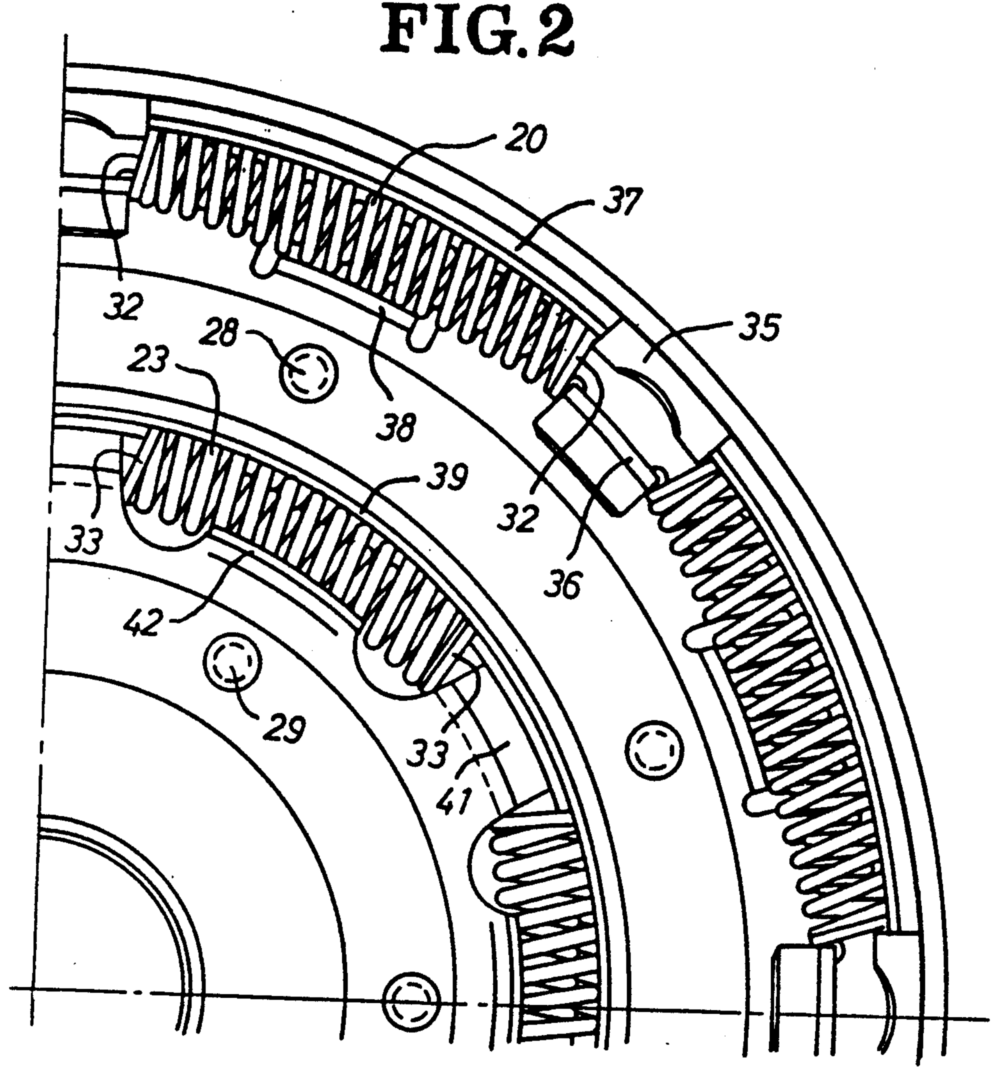
FIG. 2 is a view viewed in a direction of arrow II of FIG. 1.

FIG. 1 is a vertical, sectional partial view, showing the first embodiment of this invention and FIG. 2 is the view viewed in the direction of arrow II of FIG. 1. In these figures, the same symbols as FIG. 6 through FIG. 10 represent the same or corresponding parts. The lock-up damper device 18 of this invention consists of piston clutch plate 19, retaining plate 22 and side plate 26 composing the drive plate, the torsion springs 20 and 23 and the driven plate 21.

The piston clutch plate 19 integrally includes an end wall 19*b* extending in approximately radial direction and an outer peripheral wall 19*c* extending from an outer periphery of the end wall 19*b* toward a torque converter body side (right side of FIG. 1). A friction facing 19*a*, for frictionally engaged with the front cover 14, is bonded to an outer periphery of wall 19 on the front cover 14 side (left side of FIG. 1) face of wall 19. The piston clutch plate 19 is installed as to slide from in an axial direction (lateral direction of FIG. 1)on hub 16. On an inner peripheral part of the piston clutch plate 19, there is formed a concave portion 19*d* having an approximately U-shaped vertical section and containing about a half of torsion spring 23, i.e. the front cover 14 side of the torsion spring 23. The concave portion 19*d* is recessed toward the front cover 14 side.

Both outer torsion spring 20 and inner torsion spring 23 are longitudinal in the circumferential direction of plate 19, and in this embodiment eight outer torsion springs 20 and six inner torsion springs 23 are disposed in the circumferential direction with equal spaces left therebetween. The torsion spring 20 is contained in a space 30 at a corner part comprising the peripheral wall 19*c* and the end wall 19*b*, and is held by the retaining plate 22. About half of torsion spring 23 is contained in the concave portion 19*d* i.e. semi-circular portion, and is held therein by the concave portion 19*d*, the retaining plate 22 and the side plate 26. Thus, the torsion spring 20 are installed on a radial outer peripheral part of piston clutch plate 19 and the torsion spring 23 are installed on an inner peripheral part. The retaining plate 22 and the side plate 26 are both secured to a turbine 12 side (right side of FIG. 1) of the piston clutch plate 19. The retaining plate 22 is secured by a rivet 28 to a part located between the space 30 and the concave portion 19*d*, and the side plate 26 is secured by a rivet 29 to a peripheral part located at inside from the concave portion 19*d*.

Spring seats 32 and 33 (FIG. 2) press on circumferential opposite ends of the torsion springs 20 and 23, respectively. Projections 35 and 36 formed on the retaining plate 22 by punching-up work press on the spring seat 32. The projection 35, FIG. 1, extends from outer peripheral side to a center of the spring seat 32, and the projection 36 extends from the end wall 19*b* side to the center of the spring seat 32. Hood-like projections 37 and 38 for holding the torsion spring 20 from both radial outer peripheral and inner peripheral sides are formed on the retaining plate 22, and the torsion spring 20 is held by the retaining plate 22 in such a manner that spring 20 is wrapped from the end wall 19*b* side.

On the other hand, the torsion spring 23 is installed in such a manner that radial outer peripheral, inner peripheral and side portions of the approximately semicircular front cover 14 side face of the torsion spring 23 contact with a wall of the concave portion 19*d*, a projection 39 formed on an inner peripheral edge of the retaining plate 22 contacts with an outer peripheral part of the approximately semi-circular turbine 12 side face of the torsion spring 23, and a projection 42 formed on the side plate 26 by punching-up work contacts with the inner peripheral part of torsion spring 23. Further, a projection 41 formed on an outer peripheral part of the side plate 26 by punching-up work presses on the spring seat 33. The projection 41 is so curved as to protrude toward the end wall 19*b* side. As described above, the torsion spring 23 contacts with the wall of the concave portion 19*d*, and is not held by the retaining plate 22 in such a manner that torsion spring 23 is wrapped from the front cover 14 side, as in case of the conventional embodiment illustrated in FIG. 10. Therefore, a torsion spring 23 can be used in this embodiment, which has a diameter larger than that of the embodiment of FIG. 10 by an amount corresponding to a plate thickness (thickness X of FIG. 10) of the retaining plate 22.

The driven plate 21 is installed along the turbine 12, and its inner peripheral edge is secured to the hub 16 by a rivet 51. A projection 43 is formed on an outer peripheral edge of the driven plate 21 and a projection 44 is formed on its inner peripheral edge by the punching-up work, respectively. The projection 43 extends in between the projections 35 and 36 to press on the spring seat 32, and the projection 44 extends to the center of the spring seat 33 to press on the spring seat 33.

Figure 3:
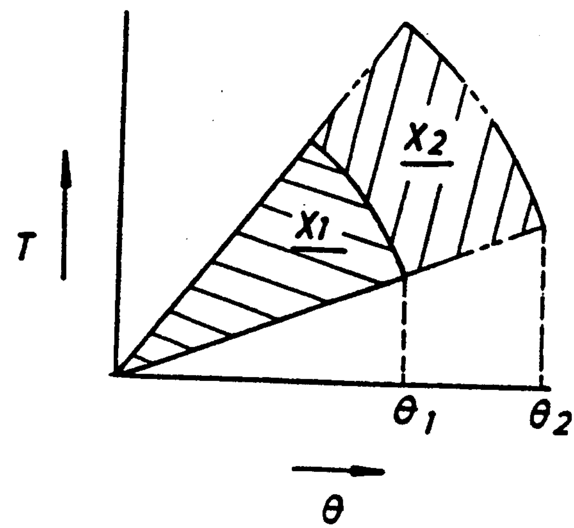
FIG. 3 is a diagram showing a characteristic of torsion angle $\theta$ in relation to transmission torque T.

Function will be described hereunder. When the piston clutch plate 19 slides toward the front cover 14 side to cause the friction facing 19*a* to press on the front cover 14, a torque of engine (not shown) is transmitted through the front cover 14 and friction facing 19*a* to the hub 16 and, the output shaft 17 as described below. Namely, torque is transmitted through the piston clutch plate 19, the retaining plate 22, the projections 35 and 36, the torsion spring 20, the projection 43 and the driven plate 21 in a transmission route of the torsion spring 20; while torque is transmitted through the piston clutch plate 19, the side plate 26, the projection 41, the torsion spring 23, the projection 44 and the driven plate 21 in a transmission route of the torsion spring 23. The torque is transmitted through spring forces of the torsion springs 20 and 23 in this instance, so that engine vibrations are prevented from being transmitted to the output shaft 17. Further, the torsion spring 23, having a diameter larger than the torsion spring of FIG. 10 is used, so that the engine vibrational absorptivity of the torsion, spring 23 is improved as compared with the conventional embodiment of FIG. 10, and the characteristic of transmission torque T in relation to torsion angle $\theta$ of the lock-up damper device 18 of this embodiment is widened from a range X1 of the conventional embodiment of FIG. 10 to a range X2 as diagrammed in FIG. 3.

Figure 10:
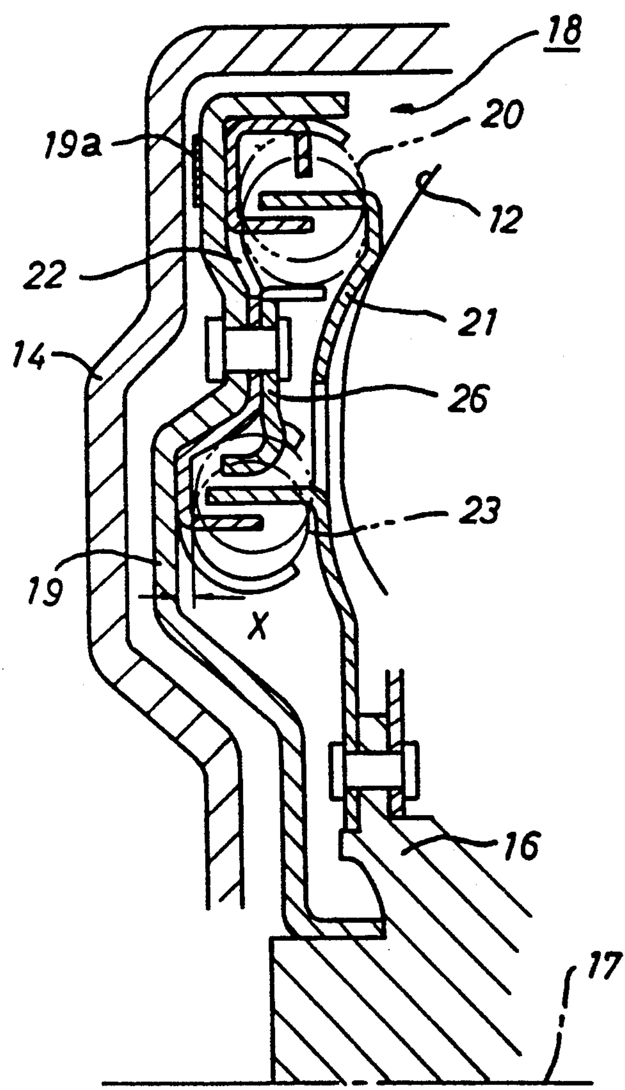
Figure 9:
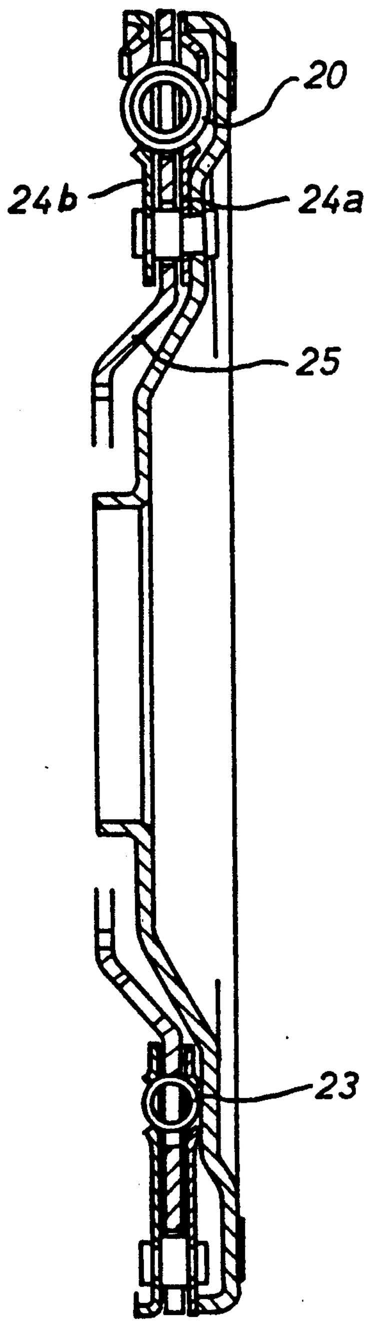

As described above, in the lock-up damper device 18 for the torque converter of this first embodiment, the radial outer peripheral, inner peripheral and side portions of the semi-circular front cover 14 side face of the torsion spring 23 installed on the inner peripheral part are made contact with the wall of the concave portion 19*d* of the piston clutch plate 19, so that the torsion spring 23, having a diameter larger than that of FIG. 10 can be used and the engine vibrational absorptivity attained by the torsion spring 21 can be improved as compared with the conventional embodiment of the FIG. 10. Accordingly, the characteristic of transmission torque T in relation to torsion angle $\theta$ of the lock-up damper device 18 is widened from the range X1 of the embodiment of FIG. 10 to the range X2 as diagrammed in FIG. 3, the torsion angle is also increased from $\theta 1$ to $\theta 2$, the vibrational absorptivity of the lock-up damper device 18 can be improved, and the characteristic of transmission torque T in relation to torsion angle $\theta$ can be set over a wide range according to requirements of the vehicle.

Moreover, since the torsion spring 23 is held by the concave portion 19*d*, the projection 39 of the retaining plate 22 and the projection 42 of the side plate 26; the retaining plate 22 becomes simple in its structure and light in its weight as compared with the embodiment of FIG. 10. Consequently, the retaining plate 22 can be formed more easily and the lock-up damper device 18 can be lessened in its weight and reduced in its cost.

Second embodiment

Figure 4:
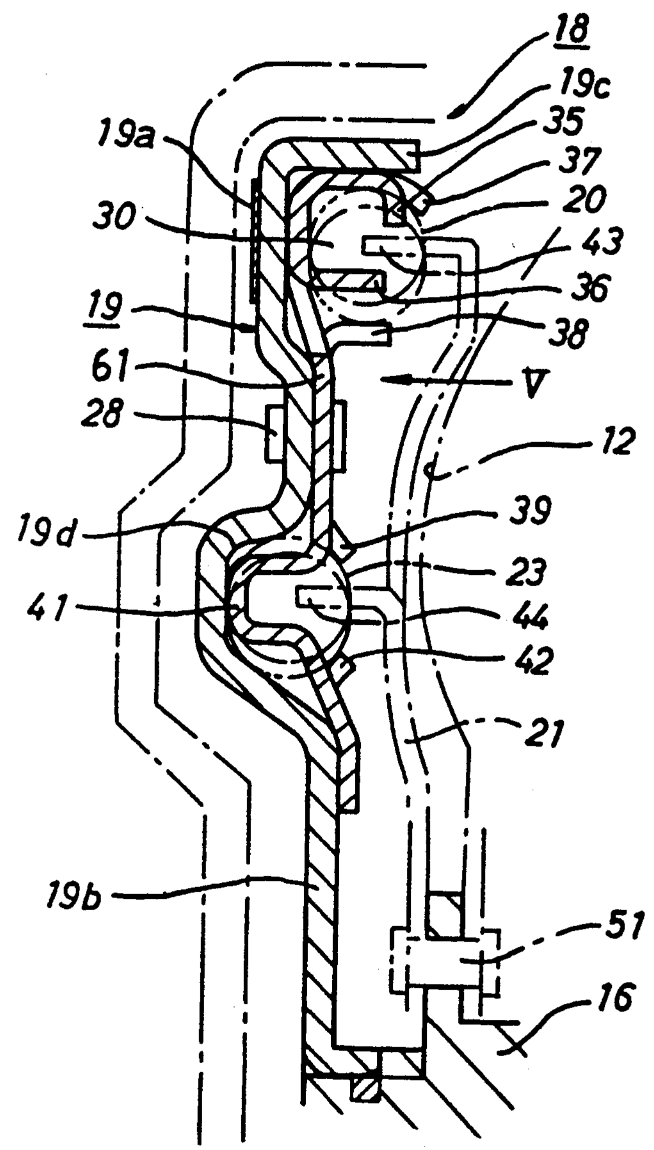
FIG. 4 is a vertical sectional partial view showing a second embodiment of this invention.
Figure 5:
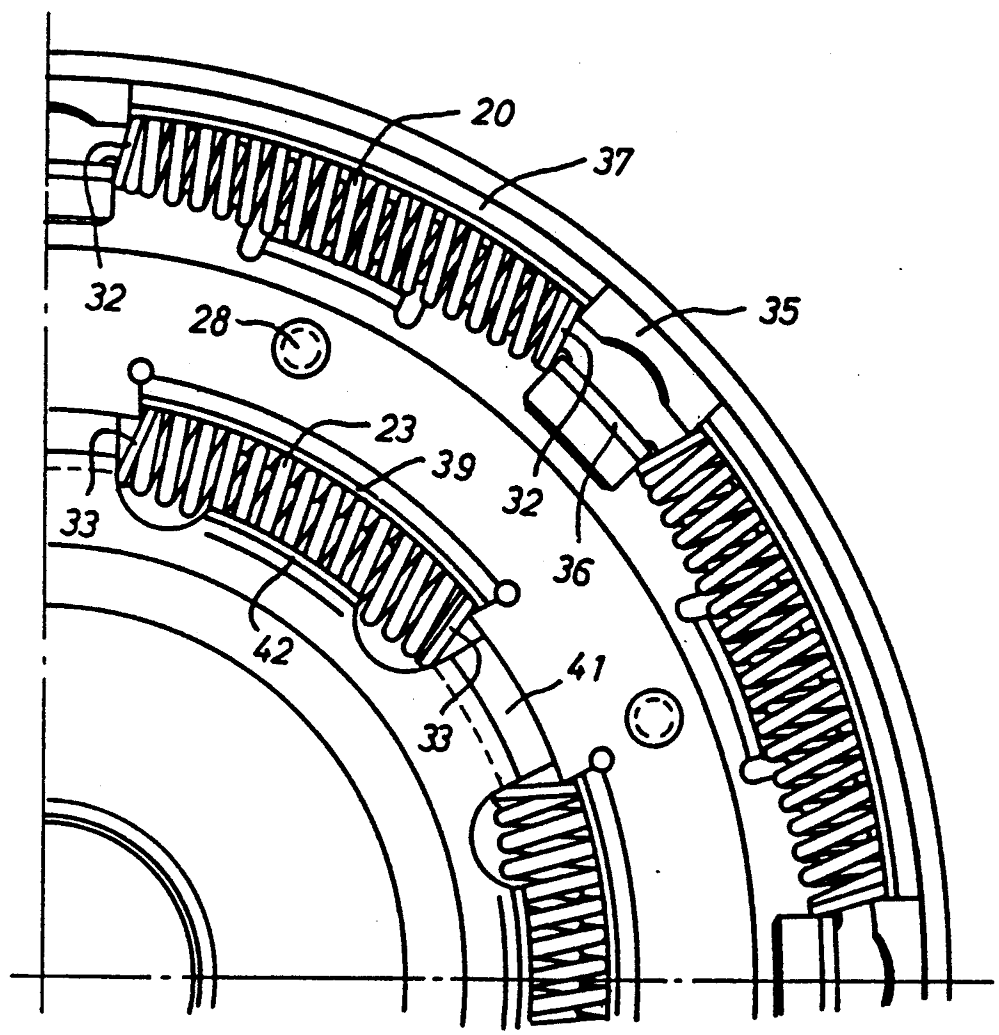
FIG. 5 is a view viewed in a direction of arrow V of FIG. 4.
Figure 8:
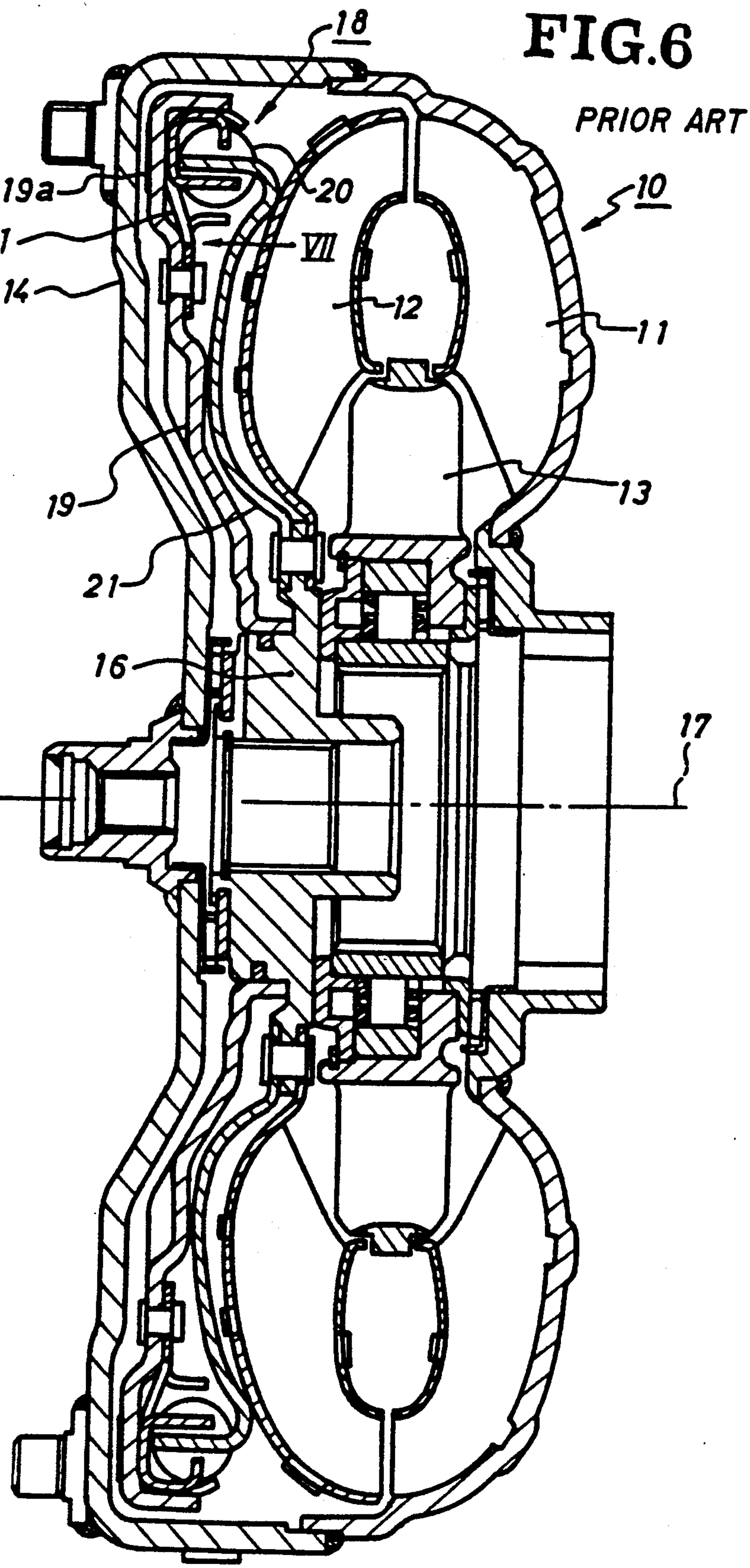
FIG. 8 through FIG. 10 are vertical sectional partial views showing other conventional lock-up damper devices.
Figure 7:
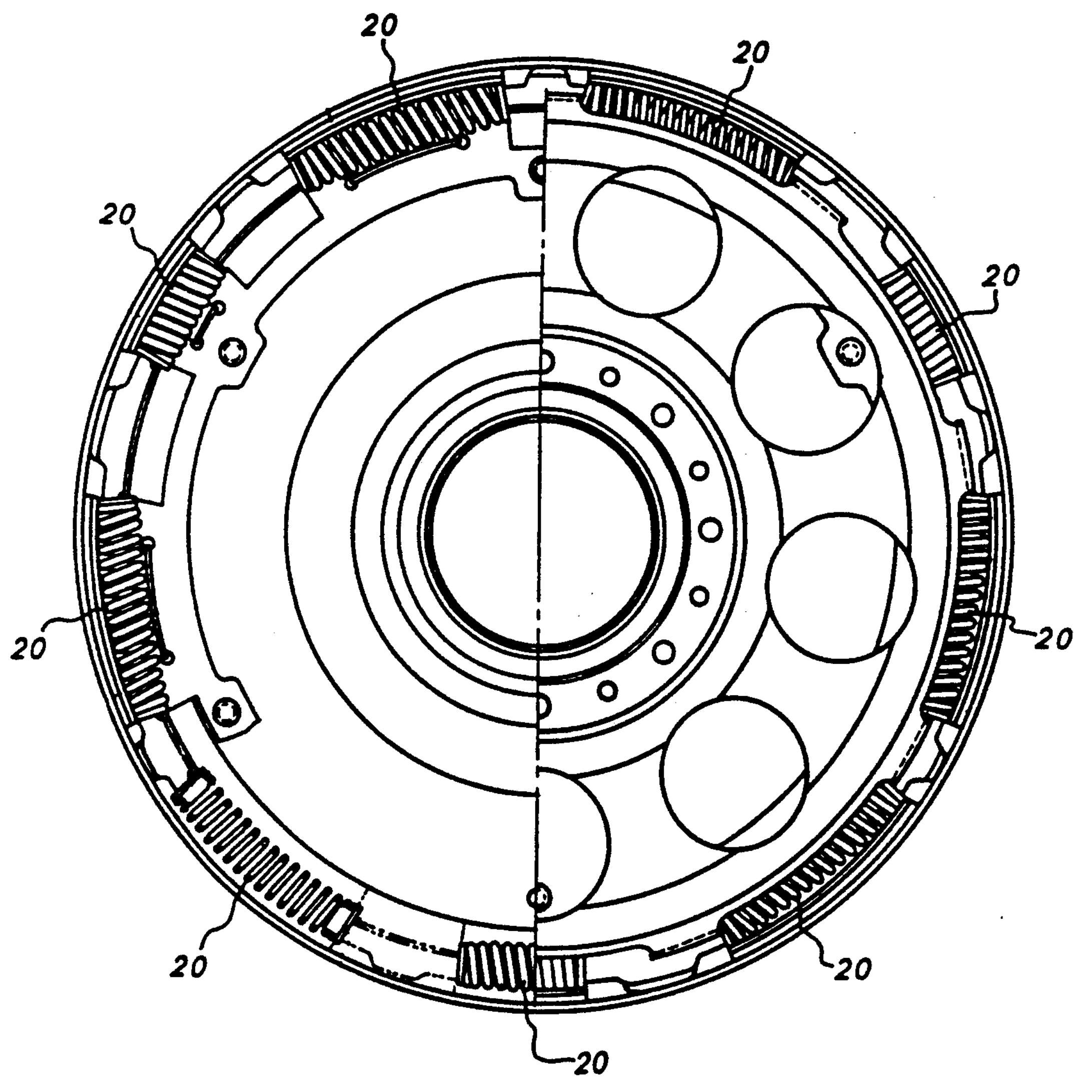
FIG. 7 is a view viewed in a direction of arrow VII of FIG. 6.

FIG. 4 is the vertical sectional partial view showing the second embodiment of this invention and FIG. 5 is the view viewed in the direction of arrow V of FIG. 4. In these figures, the same symbols as used in FIG. 1 through FIG. 2 will be used to represent the same or corresponding parts. The lock-up damper device 18 of this invention consists of the piston clutch plate 19, one drive plate 61, the torsion springs 20 and 23 and driven plate 21. On the inner peripheral part of the piston clutch plate 19, there is formed a concave portion 19*d* having an approximately U-shaped vertical section for containing about a half, i.e. the front cover 14 side, of the torsion spring 23. The concave portion 19*d* is recessed toward the front cover 14 side. The drive plate 61 has a structure integrating the retaining plate 22 and the side plate 26 of the first embodiment as described later. Both the outer torsion springs 20 and the inner torsion spring 23 are longitudinal in the circumferential direction as in case of the first embodiment, and eight torsion springs 20 and six torsion springs 23 are disposed in the circumferential direction with equal spaces left therebetween, respectively.

The outer torsion spring 20 is contained in a space 30 at a corner part comprising the peripheral wall 19*c* and the end wall 19*b*, and is held by the a radial outer peripheral part of the drive plate 61. About a half of inner torsion springs 23 is contained in the concave portion 19*d*, and is held by the concave portion 19*d* and an inner peripheral part of the drive plate 61. The drive plate 61 is secured by a rivet 28 to a turbine 12 side (right side of FIG. 4) face of the end wall 19*b* of the piston clutch plate 19 between the space 30 and the concave portion 19*d*.

Spring seats 32 and 33 (FIG. 5) press on circumferential opposite ends of the torsion springs 20 and 23, respectively. The projections 35 and 36 formed on an outer peripheral part of the drive plate 61 by punching-up work press on the spring seat 32. The projection 35 extends from the outer peripheral side to the center of the spring seat 32, and the projection 36 extends from the end wall 19*b* side to the center of the spring seat 32. Hood-like projections 37 and 38, for holding the torsion spring 20 from both radial outer peripheral and inner peripheral sides, are formed on the outer peripheral part of the drive plate 6. The torsion spring 20 is held by the outer peripheral part, of the drive plate 61 in such a manner that torsion spring 20 is wrapped from the end wall 19*b* side.

Torsion spring 23 is installed in such a manner that radial outer peripheral, inner peripheral and side portions of the approximately semi-circular front cover 14 side face of the torsion spring 23 contact with the wall of the concave portion 19*d*. Projections 39 and 42, formed on the inner peripheral part of the drive plate 61 by punching-up work, contact with the outer and inner peripheral parts of the approximately semi-circular turbine 12 side face of the torsion spring 23. Further, the projection 41, formed on the inner peripheral part of the drive plate 61 by punching-up work, presses on the spring seat 33. The projection 41 is so curved as to protrude toward the end wall 19*b* side. As described above, the torsion spring 23 contacts with the wall of the concave portion 19*d*, and is not held by the retaining plate 22, in such the manner that it is wrapped from the front cover 14 side, as in case of the conventional embodiment illustrated by FIG. 10. Therefore, a torsion spring 23 can be used in this embodiment, which has a diameter larger than that of the embodiment of FIG. 10 by an amount corresponding to a plate thickness (thickness X of FIG. 10) of the retaining plate 22.

Function will be described hereunder. When the piston clutch plate 19 slides toward the front cover 14 side to cause the friction facing 19*a* to press on the front cover 14, the torque of engine (not shown) is transmitted through the front cover 14 and friction facing 19*a* to the hub 16 and the output shaft 17 as described below. Namely, it is transmitted through the piston clutch plate 19, the drive plate 61, the projections 35 and 36, the torsion spring 20, the projection 43 and the driven plate 21 in the transmission route of the torsion spring 20; while it is transmitted through the piston clutch plate 19, the drive plate 61, the projection 41, the torsion spring 23, the projection 44 and the driven plate 21 in the transmission route of the torsion spring 23. The torque is transmitted through spring forces of the torsion springs 20 and 23, so that engine vibrations are prevented from being transmitted to the output shaft 17. Further, the torsion spring 23, having the diameter larger than that of FIG. 10 is used, so that the engine vibrational absorptivity of the torsion spring 23 is improved, as compared with the embodiment of FIG. 10, in the same manner as the first embodiment, and the characteristic of transmission torque T, in relation to torsion angle $\theta$ of the lock-up damper device 18, is also widened from the range X1 of the embodiment of FIG. 10 to the range X2 as diagrammed in FIG. 3.

As described above, also in the lock-up damper device 18 for the torque converter of the second embodiment, the torsion spring 23, having a diameter larger than that of FIG. 10, can be used and the engine vibrational absorptivity attained by the torsion spring 23 can be improved, as compared with the embodiment of FIG. 10 in the same manner as the first embodiment. Accordingly, the characteristic of transmission torque T, in relation to torsion angle $\theta$ of the lock-up damper device 18, is also widened from the range X1 of the embodiment of FIG. 10 to the range X2 as diagrammed in FIG. 3, the torsion angle is also increased from $\theta 1$ to $\theta 2$. The vibrational absorptivity of the lock-up damper device 18 can be improved, and the characteristic of transmission torque T in relation to torsion angle $\theta$ can be set over a wide range according to requirements of the vehicle.

Moreover, since the torsion spring 23 is held by the concave portion 19*d* and the projections 39 and 42 on the inner peripheral part of the drive plate 61 and, at the same time, only one drive plate is used for holding the torsion springs 20 and 23; the drive plate can be decreased in its quantity of component, becomes simple in its structure and light in its weight as compared with the first embodiment and that of FIG. 10. Consequently, the device 18 can be formed more easily with less number of process and the lock-up damper device 18 can be lessened in its weight and reduced in its cost.

What is claimed is:

1. A lock-up damper device for a torque converter, in which a piston clutch plate, slidable in an axial direction and equipped with a friction facing for pressing on a front cover, and a driven plate, interconnected to a turbine, are installed between the front cover and the turbine, a drive plate, secured to the piston clutch plate, and the driven plate are coupled, through plural torsion springs, longitudinal of said springs and in circumferential direction of said plates, in such a manner that said driven plate and said drive plate are rotatable relative to each other, said damper device having outer and inner peripheral parts, torsion springs are installed on both said outer and said inner peripheral parts of said damper device; characterized by that said torsion springs; installed on said inner peripheral part of said damper device are at at least their radial outer periphery, radial inner periphery and side portion between said radial outer and inner peripheries in contact with a wall of a concave portion formed on said piston clutch plate, and said torsion springs installed on said outer and inner peripheral parts of said damper disc are held in place by said drive plate.

2. A lock-up damper device for a torque converter, as recited in claim 1, in which said drive plate is composed of a retaining plate and a side plate, said retaining plate is secured to a radial outer peripheral part of said piston clutch plate and said side plate is secured to an inner peripheral part of said piston plate, respective, said torsion spring installed on said outer peripheral part of said plates are held by said retaining plate, said torsion springs installed on said inner peripheral part of said plates are held in such manner that at least a radial outer periphery, an inner radial periphery and side portion between said radial outer and inner peripheries contact a wall of a concave portion formed on the piston clutch plate, an outer peripheral part of an approximately semicircular turbine side face makes contact with a projection formed on a radial inner peripheral edge of said retaining plate, and an inner peripheral part of said retaining plate makes contact with a projection formed on said side plate.

3. A lock-up damper device for a torque converter, as recited in claim 1, in which said drive plate is secured to said piston clutch plate, said torsion springs installed on said outer peripheral part of said plates are held by a radial outer peripheral part of said drive plate, said torsion springs installed on the inner peripheral part of said plates are held on such clutch plate in such a manner that at least their radial outer periphery, inner periphery and side portion between said radial inner and outer peripheries contact a wall of a concave portion formed on said piston clutch plate, and outer and inner peripheral parts of said torsion springs installed on said inner peripheral part of said plates and in contact with said wall of said concave portion on said piston plate contact with projections formed on an inner peripheral part of said drive plate.

* * * * *